No. 687,022. Patented Nov. 19, 1901.
W. P. HARRIS.
MACHINE FOR REMOVING STONES FROM CHERRIES, &c.
(Application filed May 21, 1901.)
(No Model.) 4 Sheets—Sheet 1.

Witnesses:

Inventor
William P. Harris

No. 687,022. Patented Nov. 19, 1901.
W. P. HARRIS.
MACHINE FOR REMOVING STONES FROM CHERRIES, &c.
(Application filed May 21, 1901.)

(No Model.) 4 Sheets—Sheet 2.

Witnesses:
Dennis Sumby
J. B. Keefe

Inventor
William P. Harris
By James L. Norris
Atty.

No. 687,022. Patented Nov. 19, 1901.
W. P. HARRIS.
MACHINE FOR REMOVING STONES FROM CHERRIES, &c.
(Application filed May 21, 1901.)
(No Model.) 4 Sheets—Sheet 3.

Witnesses:

Inventor
William P. Harris
By James L. Norris
Atty.

No. 687,022. Patented Nov. 19, 1901.
W. P. HARRIS.
MACHINE FOR REMOVING STONES FROM CHERRIES, &c.
(Application filed May 21, 1901.)

(No Model.) 4 Sheets—Sheet 4.

Witnesses:

Inventor
William P. Harris
By James L. Norris.
Atty.

United States Patent Office.

WILLIAM PERCY HARRIS, OF LONDON, ENGLAND.

MACHINE FOR REMOVING STONES FROM CHERRIES, &c.

SPECIFICATION forming part of Letters Patent No. 687,022, dated November 19, 1901.

Application filed May 21, 1901. Serial No. 61,255. (No model.)

*To all whom it may concern:*

Be it known that I, WILLIAM PERCY HARRIS, a subject of the King of Great Britain, residing at London, England, have invented an Improved Machine for Removing the Stones from Cherries and other Single-Stoned Fruit, of which the following is a specification.

This invention consists in the machine hereinafter described, and illustrated in the accompanying drawings, for stoning or removing the stones from cherries and other single-stoned fruit.

Figure 1:
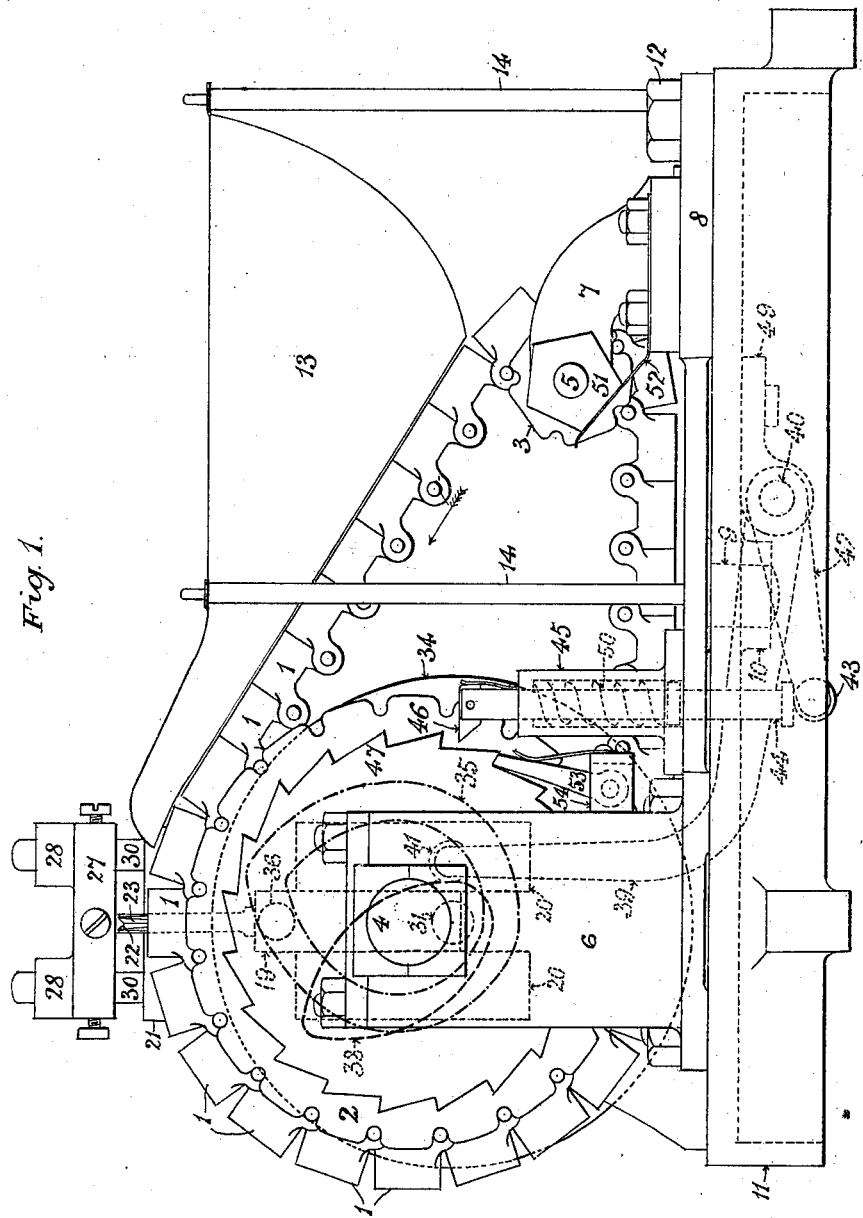
Figure 2:
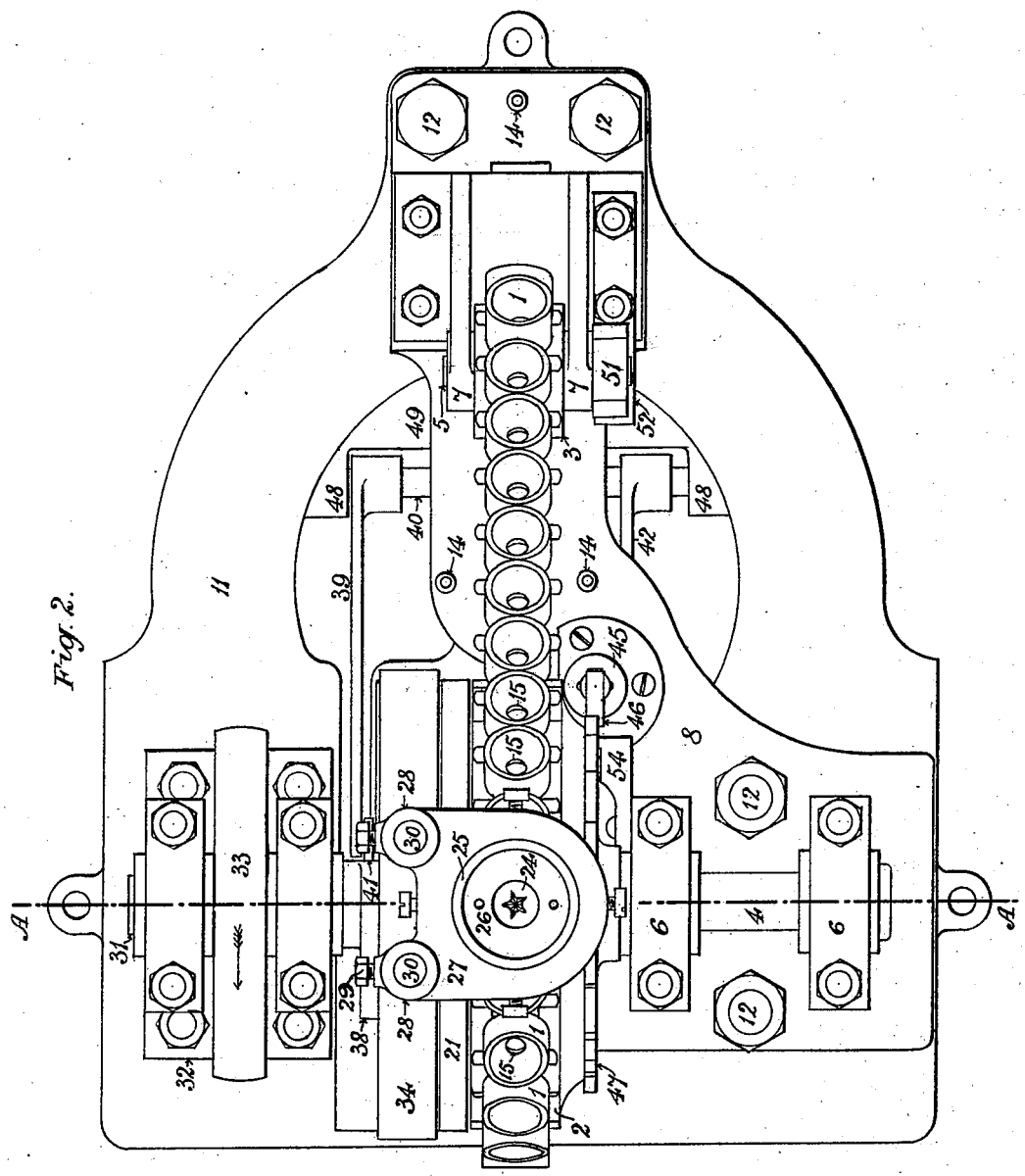
Figure 3:
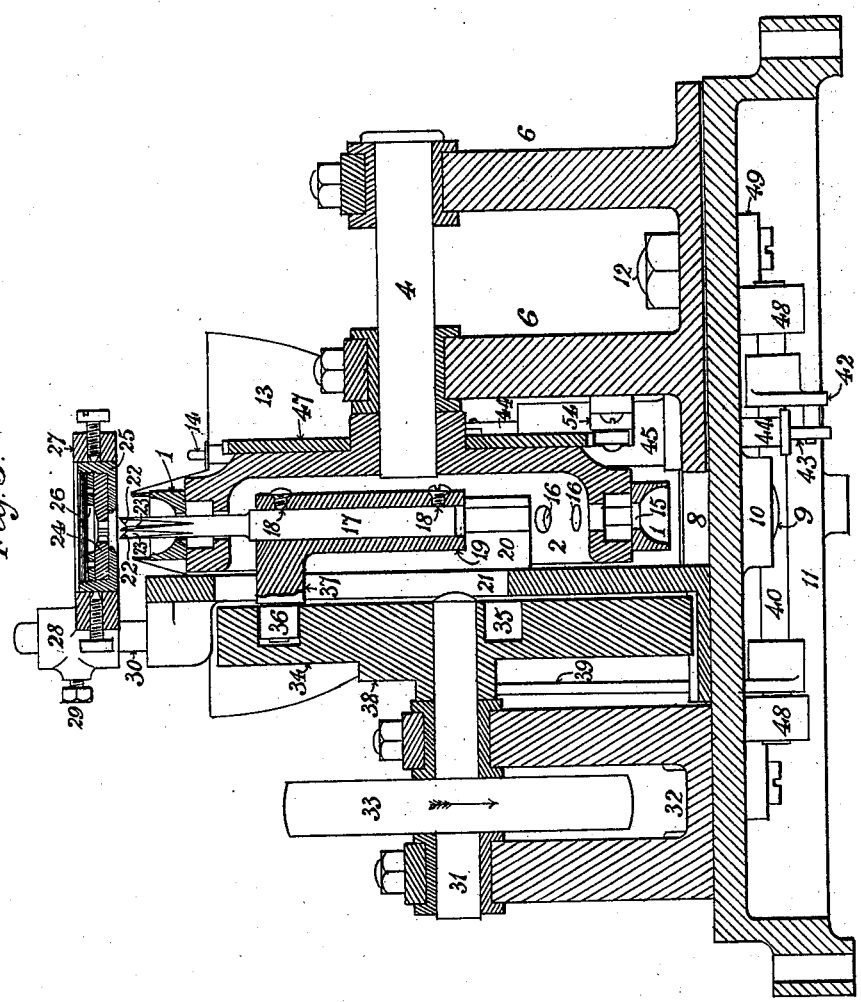
Figure 4:
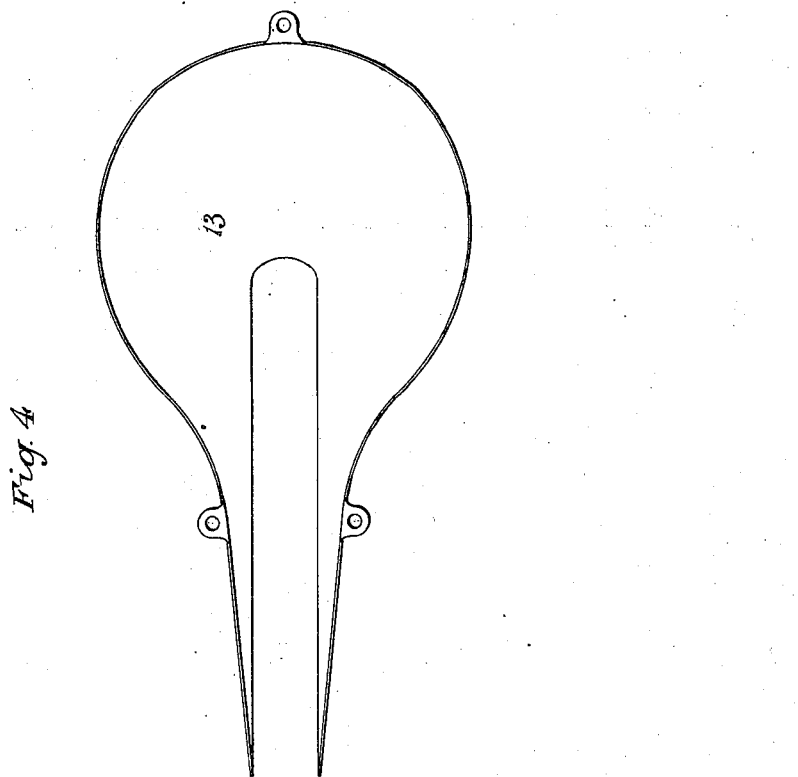

Figure 1 of the said drawings is a side elevation of a machine constructed according to this invention and suitable for removing the stones from cherries. Fig. 2 is a plan of the same with a portion removed. Fig. 3 is a section taken on the line A A, Fig. 2, looking toward the right; and Fig. 4 is a separate view of one of the parts of the machine.

In the following description the parts of the said drawings are referred to by the numerals thereon, the same numerals indicating the same parts in all the figures of the drawings.

1 1 are cups connected together in the form of an endless chain and supported by sprocket-wheels 2 3, the shafts 4 5 of which work in bearings carried by standards 6 7 on a plate 8, having a pin 9 projecting from its under side and engaging with a socket 10 in the base 11, so as to be capable of being turned or swung horizontally on the said base for the purpose hereinafter explained.

12 12 are screws and bolts by which the plate 8 is secured in the position illustrated on the the base 11 during working of the machine. The said cups 1 1 are each of a size suitable to receive the fruit to be stoned, which is fed into a hopper 13, (shown separately in plan view in Fig. 4 and not shown in Fig. 2,) supported by pillars 14 14, secured in the plate 8, and passes from the said hopper into the said cups, each of which has a central orifice 15 in the bottom part. As shown in the section Fig. 3, the sprocket-wheel 2 is hollow or dish-shaped, and has holes 16 16 formed in its rim part, which holes coincide with the orifices 15 15 in the bottoms of the cups 1 1 when the latter are in engagement with it.

The parts of the machine acting directly on the fruit are a plunger which enters the fruit and pushes out the stone and a spring opening-die against which the fruit bears during action of the said plunger and which assists the opening of the fruit for exit of the stone. The said plunger consists of a rod 17, secured by set-screws 18 18 in a slide 19, mounted in or between two vertical guides 20 20, projecting into the hollow of the sprocket-wheel 2 and formed on a standard 21, affixed to the base 11, at the free or acting end of which rod is a number of prongs having radial chisel edges 22 22, sloping downward from the periphery of the rod toward and meeting in the center or axis of the said rod, the spaces between the said prongs being of the form of angular grooves 23 23, decreasing in depth and width from the acting end of the plunger until their termination some distance therefrom at the periphery of the rod or stem part 17. The said die consists of a disk of india-rubber 24, having a central aperture of a shape approximating to that of a transverse section of the acting end of the plunger and of slightly-larger size, which disk is confined within a flanged ring 25 by means of a flat ring of metal 26, having on its periphery a screw-thread which is engaged with a corresponding screw-thread within the cylindrical part of the flanged ring 25. The die thus constructed is secured by set-screws within a circular opening in a plate 27, provided with sockets 28 28 and set-screws 29 29, by means of which the said plate is secured to vertical rods 30 30, projecting from the top of the standard 21, with which rods the sockets 28 28 are engaged.

31 is the driving-shaft of the machine, mounted in bearings supported by a standard 32, secured to the base 11 and carrying a driving-pulley 33 and a disk 34, having in one face a cam-groove 35, with which is engaged a roller 36, carried by an arm 37 on the plunger-slide 19, whereby vertical reciprocatory motion is imparted to the plunger and having on the other face a cam 38, by which intermittent motion in the direction of the arrow in Fig. 1 is communicated to the chain of cups 1 1 through the medium of mechanism consisting of the following parts: A lever 39, secured to a shaft 40 and carrying at its free end a roller 41, which bears on the said cam 38, and a lever 42, also secured to the shaft 40 and carrying at its free end a roller 43, which bears against the lower end of a rod 44, working in a guide-pillar 45, affixed to the plate 8, the said rod 44 carrying a pawl 46, which engages with a ratchet 47, carried by the sprocket-wheel 2. The shaft 40 is mounted in bearings 48 48, formed on a plate 49, secured to the under side of the base 11. Return of the pawl-rod 44 is insured by a spiral spring 50 within the guide-pillar 45, which spring bears at its upper end against an inwardly-projecting flange of the said pillar and at its lower end against a collar on the said rod. By means of the said mechanism the sprocket-wheel 2 is at each rotation of the driving-shaft 31 turned to a sufficient distance to remove one of the cups 1 from the acting point (i. e., the point at which the orifice in the bottom of the cup is exactly in line with or in the path of motion of the plunger) and bring the next cup to that point. In order to avoid possibility of non-coincidence of the cup-orifices 15 15 with the plunger, which might result from the chain of cups coming to rest beyond the required point in consequence of momentum, a polygonal plate 51 is affixed to the shaft 5 of the sprocket-wheel 3, and a spring 52 is secured in such a position relatively to it that should the said chain travel too far it is brought back by the pressure of the said spring against one of the faces of the said plate until the said chain is in the required position, when further backward motion is prevented by engagement with a tooth of the ratchet 47 of a stop-pawl 53, carried by a bracket 54, secured to the standard 6.

The machine is used and operates as follows: A supply of fruit—say cherries—to be stoned is placed in the hopper 13, and motion in the direction of the arrow in Figs. 2 and 3 is communicated to the pulley 33 on the driving-shaft 28 from any suitable motor. During each rotation of the said shaft the whole of the mechanism performs one complete series of the several actions hereinbefore described, the sequence of the said actions being as hereinafter stated, assuming that at starting the several parts are in the positions which they occupy when the cam 38 is beginning to actuate the mechanism intervening between it and the pawl-rod 44. It is to be observed that the said positions are not those in which the parts are represented in the drawings of the machine, the positions there shown being chosen in order that the acting part of the plunger may be fairly in view and clearly illustrated in all the three principal figures. The said sequence of actions is as follows: The chain of cups 1 1 is advanced in the direction of the arrow in Fig. 1 a sufficient distance to remove one cup from the acting point and bring the next cup to the same point, where it remains stationary during the remainder of the rotation of the driving-shaft. The plunger then rises through the orifice in that cup and raises the cherry therein until it bears against the rubber part 24 of the die, when the chisel edges 22 22 of the prongs of the plunger enter the cherry and come in contact with the stone and force it upward and out of the cherry through the central aperture in the said part of the die, which yields to the pressure of the cherry against it and, coöperating with the action of the plunger, assists the opening of that part of the cherry which bears against it and through which the stone passes out. At this time the several parts of the machine are slightly in advance of the positions illustrated in Figs. 1, 2, and 3, which are those they attain when the plunger has nearly completed its upward stroke. After ejection of the stone from the cherry the plunger descends, leaving the cherry free in the cup, the rubber part 24 of the die meanwhile returning to its normal state.

When access to the slide 19 or the plunger carried by it is necessary, the screws and bolts 12 12 are removed, and the plate 8 is turned aside or swung around on its center 9 away from the standard 21. It is in order to permit the said plate 8 to be thus turned until the parts carried by it are sufficiently removed from those on the base 11 that the lever 39 is shaped as illustrated in Fig. 1.

For fruit larger than cherries a plunger having a greater number of prongs with cutting edges is preferred, the number of prongs being according to the size of the fruit. Thus for stoning peaches the plunger may have from six to twelve prongs. The die also should have an opening or central aperture of sufficient size to admit of passage through it of the stone, as required.

Except in the respects mentioned, machines of the construction hereinbefore described are suitable for stoning any kind of single-stoned fruit.

What I claim as my invention, and desire to secure by Letters Patent, is—

1. In a machine for removing stones from single-stoned fruit, a pair of sprocket-wheels, one of which is formed substantially cup-shaped and having its rim provided with a circumferentially-arranged series of openings, a conveyer for the fruit traveling over said wheels and consisting of an endless chain of cups having central orifices adapted to aline with the openings in the sprocket-wheel, a yielding spring opening-die above said cup-shaped sprocket-wheel, a plunger arranged in said cup-shaped sprocket-wheel and adapted to operate through said alining openings and orifices, and mechanism for reciprocating said plunger and intermittently operating said conveyer.

2. In a machine for removing stones from single-stoned fruit, a conveyer operating to carry the fruit from a source of supply, one at a time, and to hold the fruit singly for the removal of its stone, a plunger arranged in a portion of said conveyer and adapted to remove the stone from the fruit, a yielding spring opening-die for the fruit to bear against when the plunger is acting on the fruit, a roller connected with the plunger, a disk engaging the said roller for reciprocating the plunger, mechanism for intermittently operating the conveyer, a cam carried by the disk and engaging said mechanism for operating the same, and means for operating said disk.

3. In a machine for removing stones from single-stoned fruit, a pair of sprocket-wheels, one of which is substantially cup-shaped, provided in its rim with a circumferentially-extending series of openings and further provided on one side with a ratchet, an endless chain of cups operating over said wheels and provided with orifices adapted to aline with the openings in the cup-shaped sprocket-wheel, a reciprocating plunger operating through said orifices and openings, a die arranged above said cup-shaped sprocket-wheel, a disk engaging with said plunger for reciprocating it, a lever mechanism engaging in said ratchet for intermittently operating said cup-shaped sprocket-wheel, imparting a like movement to the chain of cups, a cam carried by the disk and engaging said lever mechanism for operating the same, and means for operating the said disk.

4. In a machine for removing stones from single-stoned fruit, a conveyer mechanism for the fruit, a reciprocating plunger for stoning the fruit, a yielding spring-die for the fruit to bear against while the plunger is acting on it, a lever mechanism engaging with the conveyer mechanism for intermittently operating the same, a disk engaging with the plunger for reciprocating the same and with the lever mechanism for operating it, and means for operating said disk.

5. In a machine for removing stones from single-stoned fruit, a substantially cup-shaped sprocket-wheel provided with a circumferentially-arranged series of openings, a sprocket-wheel of less diameter than the cup-shaped wheel, an endless chain of cups operating over said wheel and provided with orifices adapted to aline with the openings in the cup-shaped wheel, a plunger operating through said orifices and openings, a disk for operating said plunger, mechanism engaging with said cup-shaped wheel for intermittently operating the same and said chain of cups, a cam carried by said disk for operating said mechanism, a spring-pressed means connected with the sprocket-wheel of smaller diameter for causing the alining of an opening and orifice, means for operating said disk, a bracket, and a pawl carried thereby for arresting the backward movement of the cup-shaped sprocket-wheel.

6. In a machine for removing stones from single-stoned fruit, a substantially cup-shaped sprocket-wheel provided with a circumferentially-arranged series of openings, a sprocket-wheel of less diameter than the cup-shaped wheel, an endless chain of cups operating over said wheel and provided with orifices adapted to aline with the openings in the cup-shaped wheel, a plunger operating through said orifices and openings, a disk for operating said plunger, mechanism engaging with said cup-shaped wheel for intermittently operating the same and said chain of cups, a cam carried by said disk for operating said mechanism, a spring-pressed means connected with the sprocket-wheel of smaller diameter for causing the alining of an opening and orifice, means for arresting the backward movement of said cup-shaped sprocket-wheel, a yielding spring-die arranged above the said cup-shaped sprocket-wheel, and means for operating said disk.

7. In a machine for removing stones from single-stoned fruit, a plunger for entering the fruit and engaging with and ejecting each stone therefrom, a yielding spring opening-die for the fruit to bear against while the plunger is so acting on the fruit, a conveyer operating to carry the fruit from the supply thereof one at a time and hold the fruit singly between said plunger and die while the said plunger is acting, a spring-actuated lever mechanism for intermittently operating said conveyer, a disk engaging with said plunger for reciprocating the same, means carried by the disk for operating said lever mechanism, and means for operating said disk.

8. In a machine for removing the stones from single-stoned fruit, a conveyer mechanism consisting of a pair of sprocket-wheels, one of which is formed with a series of circumferentially-extending openings and with a ratchet and an endless chain of cups traveling over the sprocket-wheels and provided with orifices adapted to aline with the said openings, a plunger adapted to operate through said openings and orifices, a die arranged above said plunger, a lever mechanism for intermittently operating said conveyer, means for causing the alining of the openings and orifices, and means engaging with the lever mechanism and said plunger for operating them.

9. In a machine for removing stones from single-stoned fruit, a plunger for ejecting the stones from the fruit, a die for the fruit to bear against while the plunger is acting thereon, a conveyer for carrying the fruit from a source of supply and for holding the same singly between said plunger and die while the said plunger is acting, and means engaging with the plunger for reciprocating the same and with the conveying means for intermittently operating the same.

10. In a machine for removing the stones from single-stoned fruit, means for ejecting the stones from the fruit, a conveying means for carrying the fruit to be acted upon by the ejecting means and for holding the fruit when the ejecting means is operating thereon, and means engaging with the ejecting means for operating the same and with the conveying means for intermittently operating the same.

11. In a machine for removing the stones from single-stoned fruit, means for ejecting the stones from the fruit, a conveying means for carrying the fruit to be acted upon by the ejecting means and for holding the fruit when the ejecting means is operating thereon, a disk engaging with the ejecting means for operating the same and with the conveying mechanism for intermittently operating the same, and means for operating said disk.

In testimony whereof I have signed my name to this specification in the presence of two subscribing witnesses.

WILLIAM PERCY HARRIS. [L. S.]

Witnesses:
 WILLIAM HOLMES,
 CHARLES BECKENSALL.